W. BARTHOLOMEW & G. SIMON.
ALTERNATING ROTARY GEARING.
APPLICATION FILED DEC. 22, 1913.

1,245,308.

Patented Nov. 6, 1917.
6 SHEETS—SHEET 5.

W. BARTHOLOMEW & G. SIMON.
ALTERNATING ROTARY GEARING.
APPLICATION FILED DEC. 22, 1913.
1,245,308.
Patented Nov. 6, 1917.
6 SHEETS—SHEET 6.
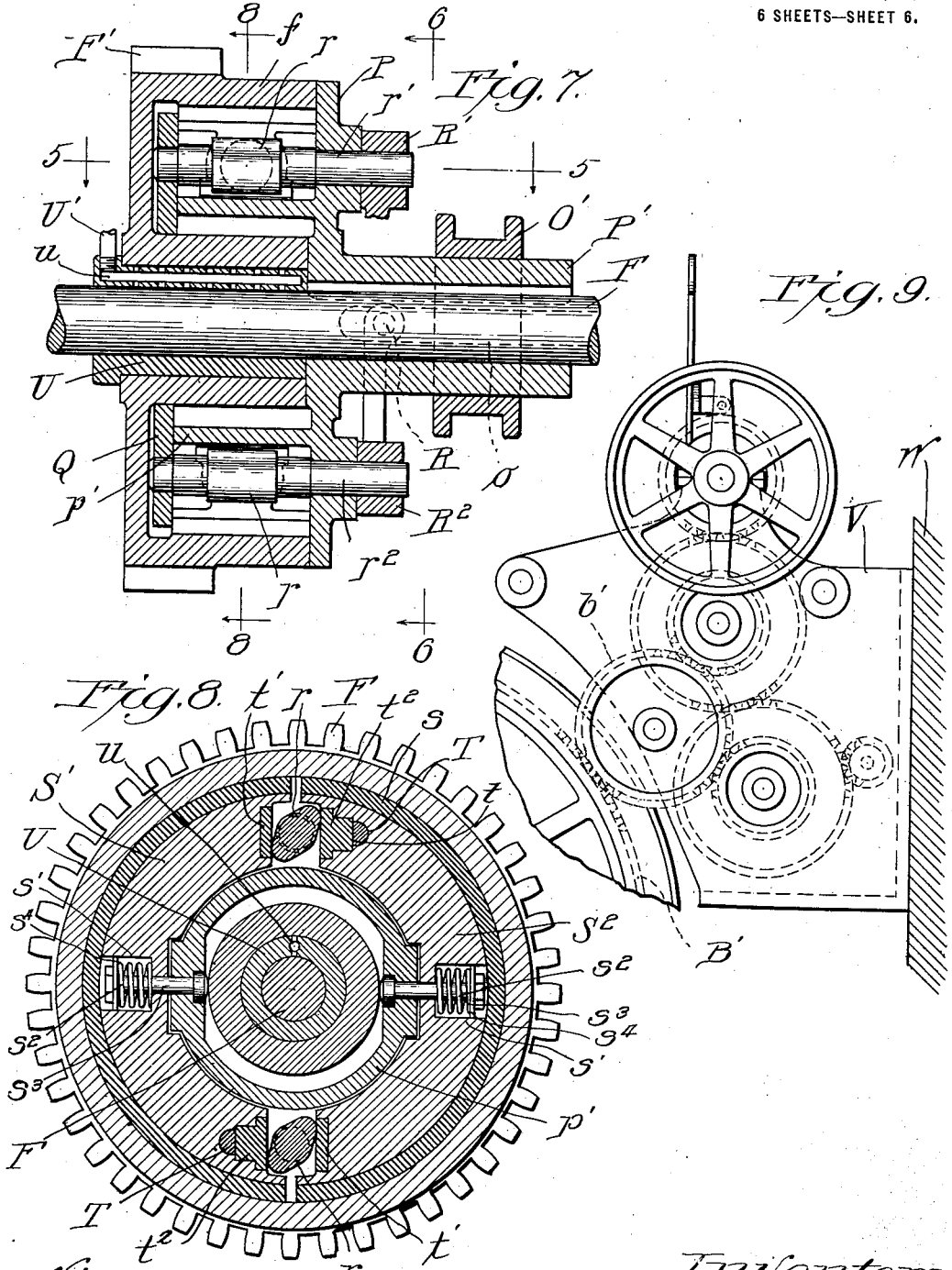

UNITED STATES PATENT OFFICE.

WILLIAM BARTHOLOMEW AND GEORGE SIMON, OF CHICAGO, ILLINOIS, ASSIGNORS TO TROY LAUNDRY MACHINERY COMPANY, LIMITED, OF CHICAGO, ILLINOIS, A CORPORATION OF NEW YORK.

ALTERNATING ROTARY GEARING.

1,245,308.    Specification of Letters Patent.    Patented Nov. 6, 1917.

Application filed December 22, 1913.  Serial No. 808,225.

*To all whom it may concern:*

Be it known that we, WILLIAM BARTHOLOMEW, a citizen of the United States, residing at Chicago, in the county of Cook and State of Illinois, and GEORGE SIMON, a citizen of the United States, residing at Chicago, in the county of Cook and State of Illinois, have invented certain new and useful Improvements in Alternating Rotary Gearing, of which the following is a specification.

Our invention relates in general to power transmitting mechanism and more particularly to mechanism for automatically and periodically reversing the direction of rotation of a driven element.

In the operation of certain classes of machines it is necessary that a driven element should periodically have its direction of movement reversed. In cylinder washing machines, for instance, it is desirable that the direction of rotation of the cylinder, which contains the articles being washed, should be periodically reversed in order that the articles may be agitated and all portions thereof exposed to the action of the suds.

The primary object of our invention is to provide an improved power transmitting mechanism for automatically reversing the direction of rotation of a driven element at predetermined intervals, and which will involve neither the shifting of belts, nor the use of bevel gears.

A further object of our invention is to provide an improved transmission gearing for converting continuous rotary motion into alternating rotary motion, which may be mounted in a fixed position independently of the machines which it drives, so that the machines may, when occasion requires, be moved away from or into engagement with the transmission gearing.

A still further object of our invention is to provide automatically operating reversing mechanism, which will be simple in construction, efficient in operation, and durable in use.

Our invention will be hereinafter more fully disclosed by reference to the accompanying drawings, in which our invention is illustrated as embodied in two convenient and practical forms, and in which—

Figure 1:
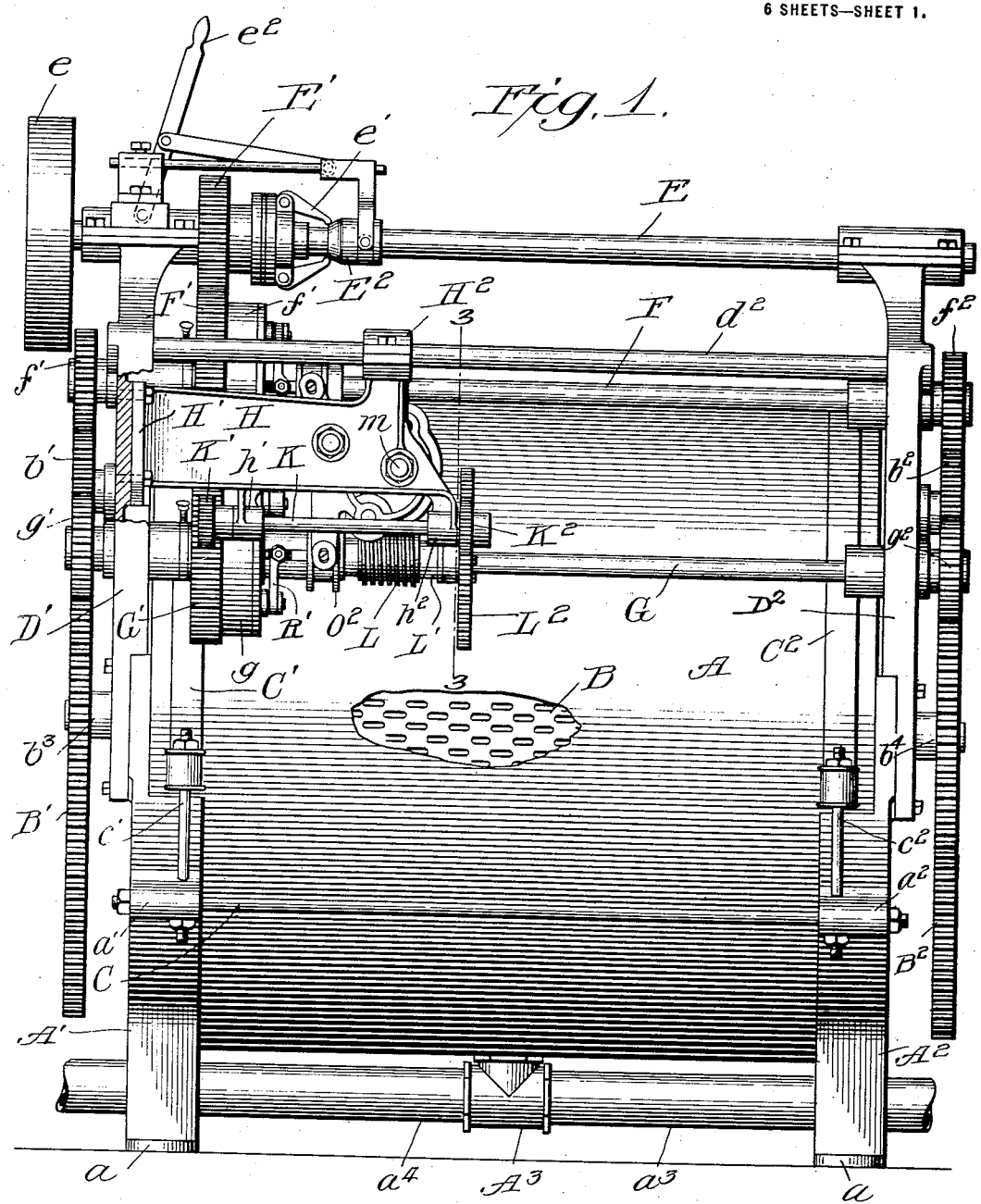
Figure 2:
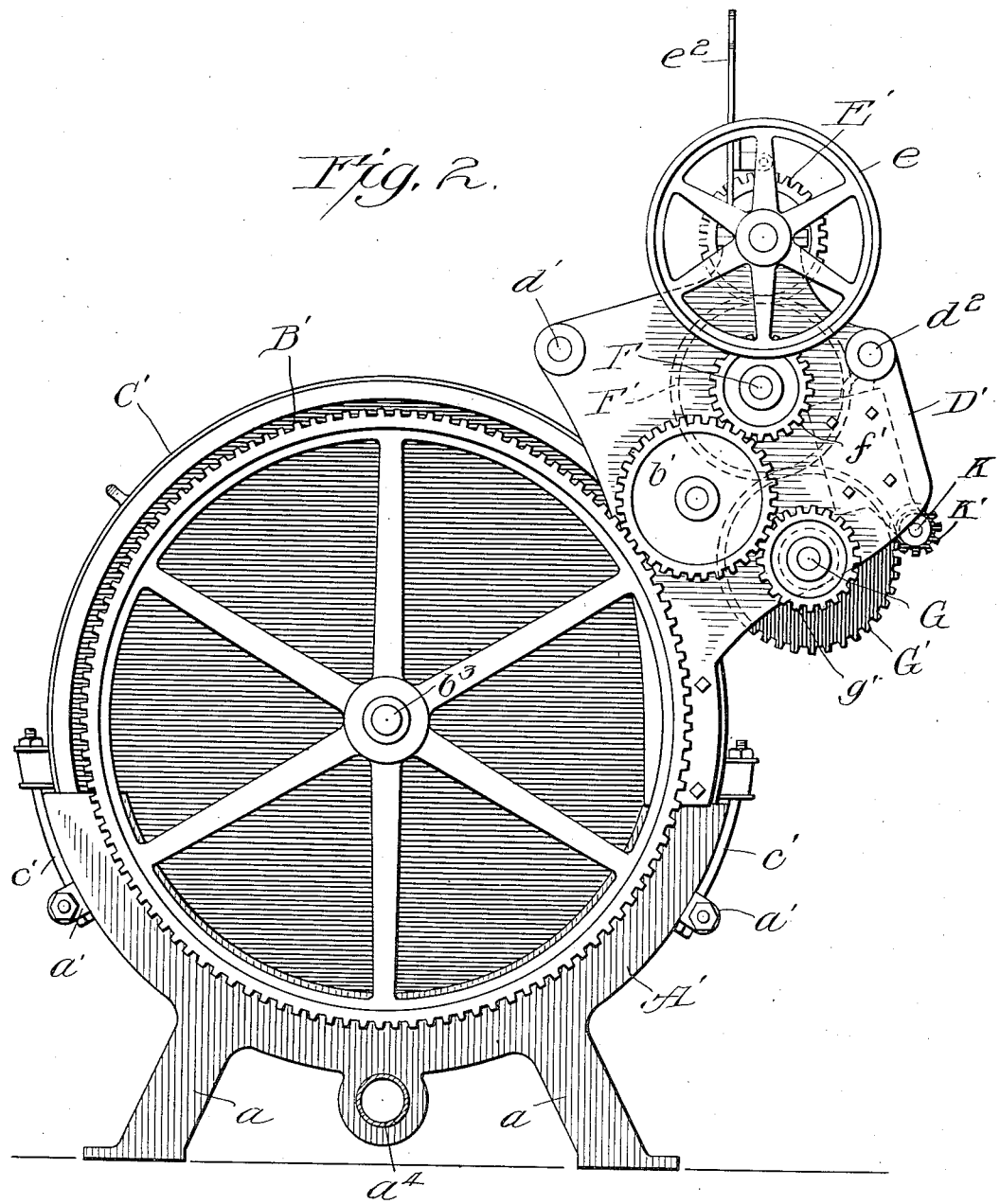
Figure 3:
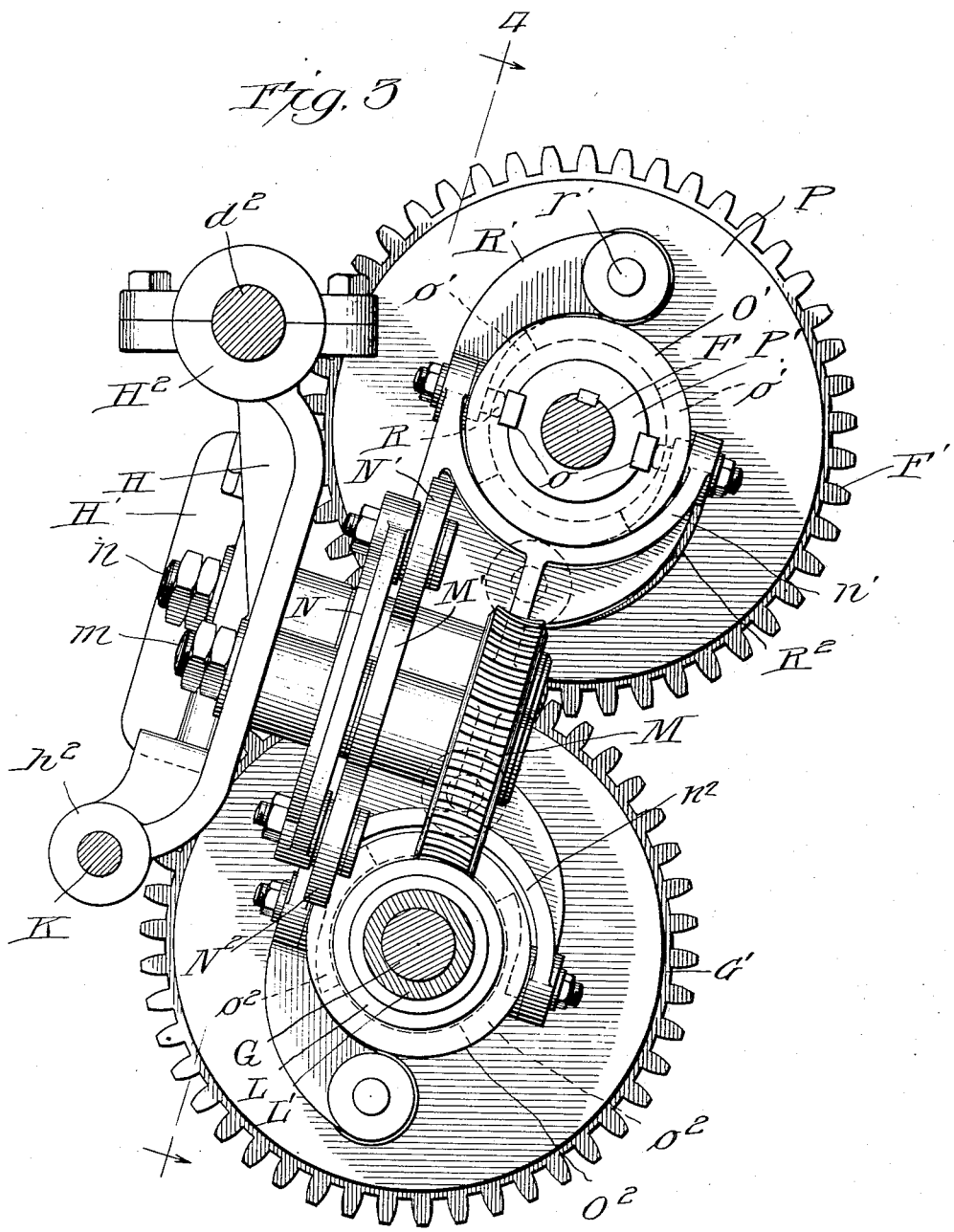
Figure 4:
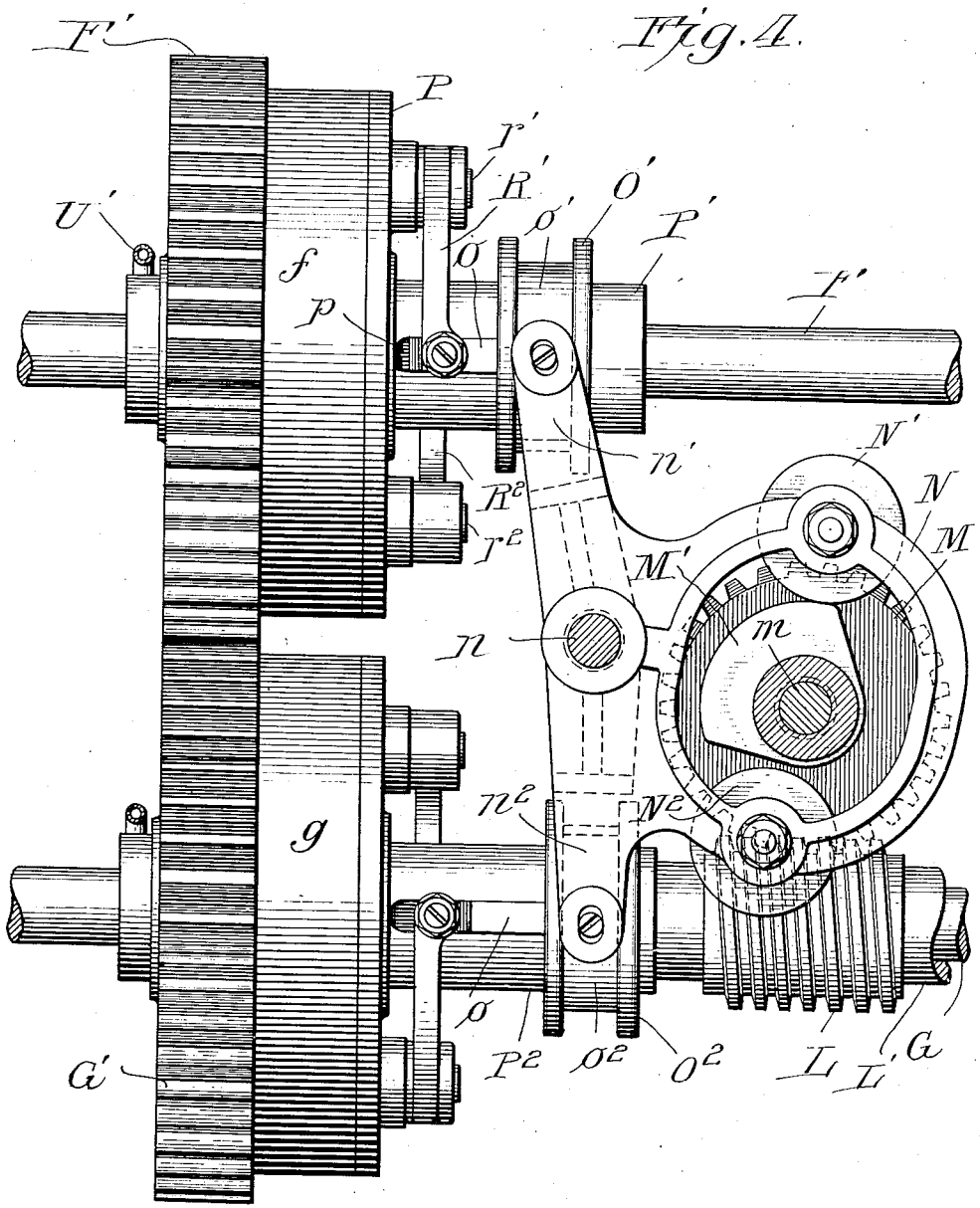
Figure 5:
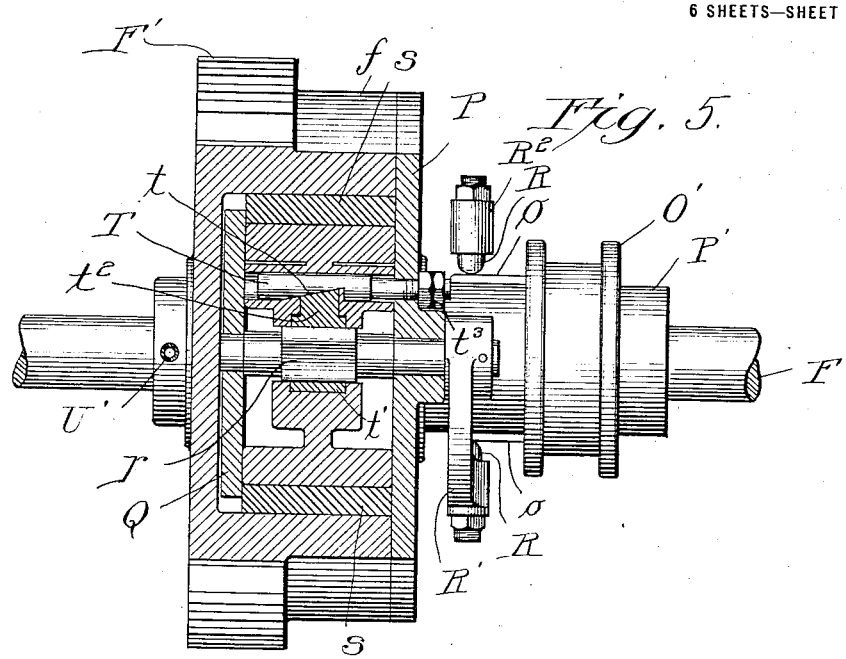
Figure 6:
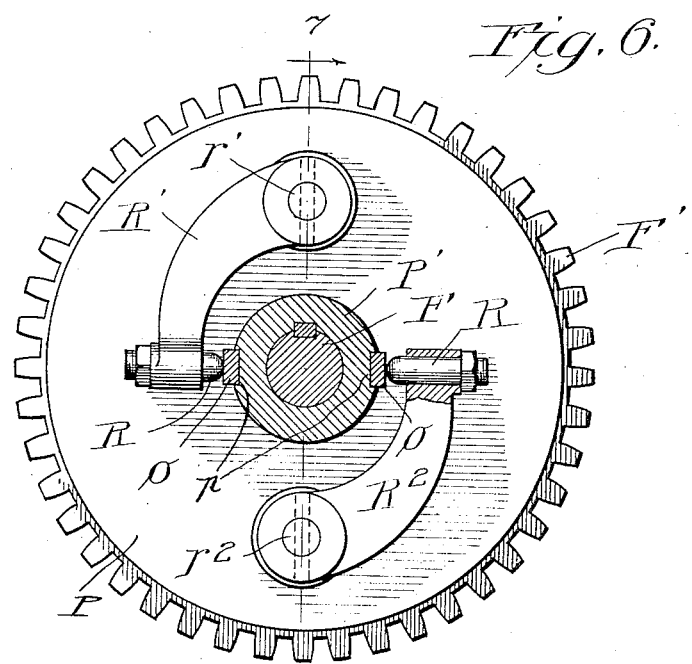

Figure 1 is a rear elevational view;

Fig. 2 a side elevational view looking from the left in Fig. 1;

Fig. 3 an enlarged detail sectional view on line 3, 3, Fig. 1;

Fig. 4 an elevational view looking from the left in Fig. 3, parts being shown in section on the line 4, 4 of Fig. 3;

Fig. 5 is a sectional plan view on line 5, 5, Fig. 7;

Fig. 6 a sectional view on line 6, 6, Fig. 7;

Fig. 7 a vertical sectional view on line 7, 7, Fig. 6;

Fig. 8 a sectional view on line 8, 8, Fig. 7; and

Fig. 9 an elevational view of a modified form of our invention in which the transmission and reversing mechanism is mounted upon a stationary support independently of the driven machine.

Similar reference characters are used to designate similar parts in the several figures of the drawings.

Reference letter A designates a cylindrical tank of a washing machine suitably supported at its opposite ends by means of standards A' and $A^2$, each of which is provided with a pair of feet $a$. Within the cylindrical tank A is mounted the rotary cylinder B adapted to contain the articles to be washed. The cylinder B is provided with concentric trunnions $b^3$ and $b^4$, which project through the heads of the tank A and have fixed to them large gear wheels B' and $B^2$, respectively. The tank A is provided with suitable conduits communicating therewith for the supply of fresh water thereto and for the discharge of dirty suds therefrom, such for instance at a T-coupling $A^3$ with which communicate conduits $a^3$ and $a^4$.

In order to securely support the tank A upon the standards A' and A² bands C' and C² surround the end portions of the tank above the ends of the standards, the ends of such bands being adjustably connected to the adjacent ends of the standards by any suitable means, such for instance, as bolts and nuts, $c'$ and $c^2$, which engage lugs on the bands and standards, as clearly shown in Figs. 1 and 2. The standards are rigidly connected with each other by means of front and rear horizontal rods C, which are connected at their ends with lugs $a'$ and $a^2$ on the standards A', A².

The cylindrical washing machine above described is not in itself comprised in our invention, but is merely illustrated and described in order that the construction and operation of our invention may be fully disclosed. It will be understood that our invention is not limited in application to a cylindrical washing machine of the character above described, and illustrated in the drawings, but is capable of application to other types of machines comprising rotary members which it is desired to drive in opposite directions at predetermined intervals.

Mounted upon, and rigidly secured to, the standards A' and A² are upwardly projecting brackets D' and D² for supporting the mechanism for driving and reversing the directions of rotation of the cylinder B. The standards D' and D² are rigidly connected by horizontal rods $d'$ and $d^2$ located adjacent the upper ends of said brackets. E designates a power shaft journaled in bearings supported at the upper ends of the said brackets D' and D², and provided with any suitable means of rotation, such for instance as a belt pulley $e$ non-rotatably secured to said shaft. Mounted upon the shaft E is a gear wheel E' which may be clutched to, or unclutched from the shaft E by means of any suitable clutch, such for instance as one comprising a pair of cam levers $e'$ adapted to be oscillated by the movement of a cone E² longitudinally upon the shaft E. $e^2$ designates a hand lever operatively connected with the cone E² for reciprocating the same to actuate the clutch to lock or unlock the gear E' relatively to the power shaft E.

The gear E' meshes with a gear F' mounted upon a horizontal shaft F rotatably supported at its ends by bearings in the brackets D' and D². The gear wheel F' meshes with a gear wheel G' mounted upon a shaft G rotatably supported in bearings in the brackets D' and D². The ends of the shaft F, which project beyond the brackets D' and D², have fixed thereon pinions $f'$ and $f^2$ which mesh with gear wheels $b'$ and $b^2$ mounted upon the brackets D' and D² and meshing with the larger gear wheels B' and B², respectively. The ends of the shaft G, which project beyond the brackets D' and D², have fixed thereon pinions $g'$ and $g^2$, which also mesh with the gear wheels $b'$ and $b^2$, respectively. It will be observed that as the meshed gears F' and G' rotate in opposite directions that by alternately clutching and unclutching the said gear wheels upon the shafts F and G, respectively, the directions of rotation of the cylinder B will be reversed.

*Clutching mechanism.*—In order that the direction of rotation for the cylinder B may be automatically reversed at predetermined intervals, we provide the following clutching mechanism for alternately clutching and unclutching the meshed gear wheels F' and G' relatively to their respective shafts F and G.

A bracket H is rigidly supported in a position adjacent to the meshed gear wheels F' and G'. One end of the bracket H is provided with a flange H' bolted to the inner surface of the supporting bracket D', and is provided with a bearing H² for supporting the same from the transverse rod $d^2$. Depending from the bracket H are bearings $h'$, $h^2$ in which is rotatably supported a shaft K having fixed to one end a pinion K' meshing with the gear wheel G', and fixed to its other end a pinion K² which meshes with a gear wheel L² fixed to a sleeve L' rotatably mounted upon the shaft G. The sleeve L' carries a worm L which meshes with a worm wheel M journaled upon a stub shaft $m$ fixed to and projecting inwardly from the bracket H. Non-rotatably secured to the worm wheel M is a cam M' located adjacent an elliptical cam frame N. Anti-friction rollers N', N² are carried by the cam frame N and are located within the path of rotation of the cam M' so as to be alternately engaged by said cam. The cam frame N is mounted to oscillate upon a stub shaft $n$ rigidly supported by and projecting inwardly from the bracket H.

Rigidly connected with the cam frame N and projecting in opposite directions above and below the stub shaft $n$ are yokes $n'$ and $n^2$, the bifurcated ends of which partially surround collars O' and O², respectively. Each of said collars is provided with a circumferential annular groove in which are seated pairs of shoes $o'$ and $o^2$ which are pivotally connected to the bifurcated ends of the respective yokes $n'$ and $n^2$.

The collars O' and O² are mounted to reciprocate upon sleeves P' and P² surrounding and keyed to the shafts F and G, respectively. Each of the sleeves P' and P² supports in the same manner the same form of expansible clutch, and hence a description of the mechanism connected with one of said sleeves will be sufficient. A disk P surrounds and is secured to the sleeve P', such disk being located adjacent a cylindrical flange $f$ carried by the gear F'. Mounted to oscillate upon the disk P are two arms R' and R² which are connected to cam rods $r'$ and $r^2$ which extend through the disk P on opposite sides of the collar P', and which are supported at their inner ends in bearings formed in a disk Q, which surrounds the hub of the gear F'. A cylindrical flange $p'$ is carried by the disk P and is concentrically located between the flange $f$ and the hub of the gear F'. Intermediate of the cylindrical flange $p'$, and the flange $f$, are located semi-cylindrical clamping members S' and S², each of such members carrying a suitable covering of wearing material $s$. The clamping members are provided with angular recesses in their inner surfaces into which extend angular projections on the opposite sides of the flange $p'$, as clearly shown in Fig. 8, so that the clamping members are non-rotatably secured to the flange $p'$ and consequently through the disk P and sleeve P' to the shaft F. The clamping members are provided with recesses $s'$ in which are located coiled springs $s^2$ surrounding bolts $s^3$, such bolts extending through the adjacent wall of the flange $p'$ and provided with heads seated within depressions in the inner surface thereof. Each spring bears against the inner wall of the surrounding recess and against a washer $s^4$ surrounding the corresponding bolt, as clearly shown in Fig. 8. These springs exert an inward pressure upon the clamping members S' and S² so as to normally disengage them from the inner surface of the flange $f$.

The ends of the oscillatory arms R', R² are provided with inwardly projecting studs R which engage underlying wedge strips $o$ carried by the collar O' on opposite sides thereof. The wedge strips engage longitudinal grooves $p$ in the sleeve P' and thereby non-rotatably lock the collar to the sleeve.

The opposing surfaces of the ends of the clamping members S', S², which are engaged by the cams $r$, are provided with hard metal inserts $t'$ and $t^2$, so as to reduce to a minimum the wear on the ends of the clamping members incident to the engagement with them of the cams. One of the inserts in each pair is made adjustable so as to take up any wear which may occur either on the ends of the corresponding cam $r$, or on the inserts engaged thereby. By reference to Figs. 5 and 8 it will be seen that each of the inserts $t^2$ is provided with an inclined outer surface with which engages a correspondingly inclined surface $t$ on an adjustable rod T, such rod extending through the disk P and provided with adjusting nuts $t^3$ thereon engaging the outer surface of the disk P so as to longitudinally adjust the rod and thereby move the inclined surface $t$ thereon relatively to the engaged inclined surface on the insert $t^2$, so that the latter is adjusted inwardly toward the adjacent cam $r$.

To thoroughly lubricate the bushings interposed between the hubs of the gear wheels F' and G' and the shafts F and G, respectively, we provide a bushing U of the construction illustrated in Figs. 7 and 8. A tubular passage $u$ extends axially within the bushing U above the shaft which it surrounds, and is provided with upper and lower series of perforations through which a lubricant passes to the inner surface of the hub of the gear wheel and to the outer surface of the surrounded shaft. U' designates a conduit communicating with the passage $u$ for the supply of lubricant thereto.

In lieu of providing supporting brackets mounted directly upon the machine for supporting the driving and reversing mechanism, such mechanism may be mounted upon stationary brackets independently of the driven machine. In Fig. 9 we have illustrated our invention as so modified in which V indicates one of a pair of stationary brackets mounted upon a suitable support W and located at the proper height for the gear wheels $b'$ and $b^2$ to mesh with the larger gear wheels B' and B² at the ends of the machine. The machine may consequently be moved when desired as it is merely necessary that the gear wheels B' and B² on the machine should be brought into mesh with the gear wheels $b'$ and $b^2$. The driving and reversing mechanism remains the same in construction and operation in this modification of our invention as that above described in connection with Figs. 1 to 8, inclusive, the only difference being that the supporting brackets are not mounted upon the machine, but are mounted upon stationary supports.

The operation of our invention is as follows: The articles to be washed are placed within the cylinder B and suds are supplied to the tank A in the usual manner. The clutch lever $e^2$ is then operated so as to lock the driving gear E' to the power shaft E. The gear wheels F', G' are consequently continuously rotated in opposite directions. The shaft K is continuously rotated in the same direction by reason of the engagement of the pinion K' thereon with the gear wheel G', so that the cam M' is continuously rotated in the same direction by reason of the rotation of the worm wheel M through its engagement with the worm L upon the sleeve L', which is rotated by the gear wheel L² which meshes with the pinion K² fixed to the shaft K. Assuming that the parts are in the position shown in Fig. 4, the continued rotation of the cam M' will cause the same to engage the roller N² at the bottom of the cam frame N, and thereby oscillate such frame so that the yoke n' will be moved toward the right and the yoke n² toward the left. Such movement of the yoke n' moves the collar O' toward the right upon the sleeve P', thereby withdrawing the wedge strips o from beneath the studs R on the ends of the arms R' and R² of the clutch mechanism of the upper gear wheel F'. The springs s² immediately move the clutch members S', S² inwardly out of engagement with the cylindrical flange f of the gear wheel F', owing to the fact that the crank arms R', R² are no longer held in position to maintain the cams r so tilted as to outwardly expand the clutch members. (See Fig. 8.) The gear F' is consequently unclutched from the shaft F and continues to rotate idly thereon.

The movement of the yoke n² toward the left in Fig. 4 moves the collar O² toward the left and with it the wedge strips o, so that the latter pass beneath the studs R on the end of the corresponding crank arms R' and R². The crank arms are consequently oscillated and with them the respective cams r which expand the clutch members within the flange g of the gear wheel G' so as to lock said gear wheel non-rotatably to the shaft G. The shaft G then becomes the driving shaft and is rotated in an opposite direction to the rotation of the shaft F when the gear wheel F' is clamped thereto. The direction of rotation of the cylinder B is therefore reversed.

The continued rotation of the cam M' causes the same to engage the anti-friction roller N' of the cam frame N and oscillate the latter to the position shown in Fig. 4 in which the gear wheel F' is clutched to the shaft F and the gear wheel G' unclutched from the shaft G, thereby again reversing the direction of rotation of the cylinder B.

From the foregoing description it will be observed that by means of our invention a rotating member of a machine may have its direction of rotation automatically changed at predetermined intervals without involving the shifting of belts or the use of beveled gear wheels. It will be further observed that our improved driving and reversing mechanism may be mounted in a stationary position independently of the machines which it operates, thereby permitting the machines to be readily moved when desired. It will also be seen that we have invented an improved means for lubricating the gear wheels and the shafts upon which they are mounted.

It will be understood that while we have illustrated and described our invention as applied to a single machine, that a plurality of machines may be driven from the same power shaft by providing each of such machines with our improved driving and reversing mechanism.

We claim:

1. In a power transmitting and reversing mechanism, the combination with a pair of meshed gear wheels, of means for driving said meshed gear wheels, a pair of shafts upon which said gear wheels are loosely mounted, means for periodically clutching in alternation each of said gear wheels to the shaft upon which it is mounted and simultaneously unclutching the other gear wheel from the shaft upon which it is mounted, a driven element, and means for gearing each of said shafts to the driven element.

2. In a power transmitting and reversing mechanism, the combination with a driving gear wheel, of a pair of meshed gear wheels with one of which said driving gear meshes, a pair of shafts upon which said pair of gear wheels are respectively loosely mounted, automatically actuated means for periodically clutching in alternation each gear wheel of said pair to the shaft upon which it is mounted and simultaneously unclutching the other gear wheel from the shaft upon which it is mounted, a driven element, and means for gearing each of said shafts to the driven element.

3. In a power transmitting and reversing mechanism, the combination with a pair of meshed gear wheels, of means for driving said meshed gear wheels, a pair of shafts upon which said gear wheels are loosely mounted, means actuated by one of said gear wheels for periodically clutching in alternation each of said gear wheels to the shaft upon which it is mounted and simultaneously unclutching the other gear wheel from the shaft upon which it is mounted, a pinion fixed to each of said shafts, and a driven gear wheel in mesh with both of said pinions.

4. In a power transmitting and reversing mechanism, the combination with a pair of meshed gear wheels, of means for driving said meshed gear wheels, a pair of shafts upon which said gear wheels are loosely mounted, a separate clutch for locking and unlocking each gear wheel respectively to the shaft upon which it is mounted, means actuated by one of said gear wheels and operatively connected to said clutches to alternately actuate them to periodically clutch and unclutch said gear wheels to and from the shafts upon which they are mounted, a driven element, and means for gearing each of said shafts to the driven element.

5. In a power transmitting and reversing mechanism, the combination with a pair of meshed gear wheels, of means for driving said meshed gear wheels, a pair of shafts upon which said gear wheels are loosely mounted, a separate clutch for locking and unlocking each gear wheel respectively to the shaft upon which it is mounted, a shaft geared to one of said pair of meshed gear wheels, a worm wheel geared to said shaft, cam mechanism actuated by said worm and operatively connected to said clutches to alternately actuate them to clutch and unclutch said gear wheels to and from the shafts upon which they are mounted, a driven element, and means for gearing each of said shafts to the driven element.

6. In a power transmitting and reversing mechanism, the combination with a pair of meshed gear wheels, of means for driving said meshed gear wheels, a pair of shafts upon which said gear wheels are loosely mounted, a separate clutch for locking and unlocking each gear wheel respectively to the shaft upon which it is mounted, a worm loosely mounted on one of said shafts, means actuated by one of said meshed gear wheels for rotating said worm, cam mechanism actuated by said worm and operatively connected with said clutches to alternately actuate them to clutch and unclutch said gear wheels to and from the shafts upon which they are mounted, a driven element, and means for gearing each of said shafts to the driven element.

7. In a power transmitting and reversing mechanism, the combination with a pair of meshed gear wheels, of means for driving said meshed gear wheels, a pair of shafts upon which said gear wheels are loosely mounted, a separate clutch for locking and unlocking each gear wheel respectively to the shaft upon which it is mounted, a worm loosely mounted on one of said shafts, a shaft geared to one of said pairs of meshed gear wheels, meshed pinions on said last mentioned shaft and worm for rotating the latter by the former, cam mechanism actuated by said worm and operatively connected with said clutches to alternately actuate them to clutch and unclutch said gear wheels to and from the shafts upon which they are mounted, of a driven element, and means for gearing each of said shafts to the driven element.

8. In a power transmitting and reversing mechanism, the combination with a pair of meshed gear wheels, of a driving gear wheel in mesh with one of said pair of gear wheels, a pair of shafts upon which said pair of gear wheels are loosely mounted, a separate clutch for locking and unlocking each of said pair of gear wheels respectively to the shaft upon which it is mounted, a worm loosely mounted on one of said pair of shafts, a shaft geared to one of said pair of meshed gear wheels, meshed gear wheels operatively connecting said last mentioned shaft and said worm, a worm wheel in mesh with said worm, a cam fixed to said worm wheel, and means actuated by said cam to alternately actuate said clutches to lock and unlock said pair of meshed gear wheels to and from the shafts upon which they are mounted, a driven element, and means for gearing each of said pair of shafts to the driven element.

9. In a power transmitting and reversing mechanism, the combination with a pair of meshed gear wheels, of a driving gear wheel in mesh with one of said pair of gear wheels, a pair of shafts upon which said pair of gear wheels are loosely mounted, a separate clutch for locking and unlocking each of said pair of gear wheels respectively to the shaft upon which it is mounted, a worm loosely mounted on one of said pair of shafts, a shaft geared to one of said pair of meshed gear wheels, meshed gear wheels operatively connecting said last mentioned shaft and said worm, a worm wheel in mesh with said worm, a cam fixed to said worm wheel, an oscillatory cam frame surrounding said cam and supported intermediate of said pair of shafts, means connecting said cam frame with said clutches to alternately actuate them to clutch and unclutch said pair of gear wheels to and from the shafts upon which they are mounted, a driven element, and means for gearing each of said pair of shafts to the driven element.

10. In a power transmitting and reversing mechanism, the combination with a pair of meshed gear wheels, of means for driving said meshed gear wheels, a pair of shafts upon which said gear wheels are loosely mounted, means actuated by one of said gear wheels for periodically clutching in alternation each of said gear wheels to the shaft upon which it is mounted and simultaneously unclutching the other gear wheel from the shaft upon which it is mounted, a pinion fixed to each of said shafts, a driven gear wheel in mesh with both of said pinions, and means for supporting said transmission and reversing mechanism independently of a machine operated thereby.

11. In a power transmitting and reversing mechanism, the combination with a pair of meshed gear wheels, of means for driving said meshed gear wheels, a pair of shafts upon which said gear wheels are loosely mounted, means actuated by one of said gear wheels for periodically clutching in alternation each of said gear wheels to the shaft upon which it is mounted and simultaneously unclutching the other gear wheel from the shaft upon which it is mounted, pinions fixed to each end of each of said pair of shafts, a rotary element, and a gear wheel fixed to each end of said element geared to the pinions on the corresponding ends of each of said pair of shafts.

12. In an alternating rotary gearing, the combination with a pair of shafts, pinions fixed to the ends of said shafts, gear wheels adjacent said pinions in mesh therewith, a driven member to which said gear wheels are connected, a pair of meshed gear wheels loosely mounted upon said shafts, means for driving said meshed gear wheels, and means for periodically clutching in alternation each of said meshed gear wheels to the shaft upon which it is mounted and simultaneously unclutching the other gear wheel from the shaft upon which it is mounted.

In testimony whereof, we have subscribed our names.

WILLIAM BARTHOLOMEW.
GEORGE SIMON.

Witnesses:
  C. M. LEARY,
  D. S. MANN.